(12) United States Patent
Servignat et al.

(10) Patent No.: US 9,174,701 B2
(45) Date of Patent: Nov. 3, 2015

(54) BICYCLE PEDAL WITH AUTOMATIC ATTACHMENT AND DETACHMENT

(75) Inventors: Hervé Servignat, Succieu (FR); Jean-François De Bast, Vaulx-Milieu (FR)

(73) Assignee: TIME SPORT INTERNATIONAL (FR)

( * ) Notice: Subject to any disclaimer, the term of this patent is extended or adjusted under 35 U.S.C. 154(b) by 1027 days.

(21) Appl. No.: 12/526,889

(22) PCT Filed: Feb. 8, 2008

(86) PCT No.: PCT/FR2008/000157
§ 371 (c)(1),
(2), (4) Date: Aug. 12, 2009

(87) PCT Pub. No.: WO2008/129145
PCT Pub. Date: Oct. 30, 2008

(65) Prior Publication Data
US 2010/0005924 A1    Jan. 14, 2010

(30) Foreign Application Priority Data

Feb. 13, 2007   (FR) ...................................... 07 01017

(51) Int. Cl.
*B62M 3/08* (2006.01)
(52) U.S. Cl.
CPC ............... *B62M 3/086* (2013.01); *Y10T 74/217* (2015.01)
(58) Field of Classification Search
CPC ......... B62M 3/086; B62M 3/083; B62M 3/08
USPC ......... 74/594.1–594.7; 36/131; 280/632, 634, 280/11.3, 11.31, 11.33, 294
See application file for complete search history.

(56) References Cited

U.S. PATENT DOCUMENTS

| | | | | |
|---|---|---|---|---|
| 562,858 | A | * | 6/1896 | Sherman ...................... 74/594.6 |
| 4,302,987 | A | * | 12/1981 | Takeda ......................... 74/594.6 |
| 4,381,683 | A | * | 5/1983 | Takeda ......................... 74/594.6 |
| 4,928,549 | A | | 5/1990 | Nagano |
| 5,105,683 | A | * | 4/1992 | Mercat et al. ................ 74/594.6 |
| 5,259,270 | A | | 11/1993 | Lin |
| 5,685,202 | A | * | 11/1997 | Chen ............................ 74/594.6 |

(Continued)

FOREIGN PATENT DOCUMENTS

| | | |
|---|---|---|
| EP | 1063161 A1 | 12/2000 |
| EP | 1377496 B1 | 1/2004 |

(Continued)

OTHER PUBLICATIONS

Description FR2862041. European Patent Office. http://translationportal.epo.org/emtp/translate/?ACTION=description-retrieval&COUNTRY=FR&ENGINE=google&FORMAT=docdb&KIND=A1&LOCALE=en_EP&NUMBER=2862041&OPS=ops.epo.org&SRCLANG=fr&TRGLANG=en.*

*Primary Examiner* — Daniel Yabut
(74) *Attorney, Agent, or Firm* — The Belles Group, P.C.

(57) ABSTRACT

A bicycle pedal with automatic attachment and detachment, the pedal having a body (2) rotating on a spindle (3) with a front stop (4) suitable for engaging with a mating stop surface (5) located on a cleat (6) fixed to the sole of the shoe of the user, and a retaining member (9) rotating about a hinge axis parallel to the pedal axis and able to be applied by an elastic return to the cleat to lock the cleat to the pedal. The elastic return means comprises a flexing element (B, 18), one end of which is housed in the pedal body, and the other end of which bears against the retaining member (9).

15 Claims, 6 Drawing Sheets

(56) References Cited

U.S. PATENT DOCUMENTS

| | | | |
|---|---|---|---|
| 5,692,415 A * | 12/1997 | Lin | 74/594.6 |
| 5,765,450 A * | 6/1998 | Kruger et al. | 74/594.6 |
| 5,787,764 A * | 8/1998 | Peyre | 74/594.6 |
| 6,216,558 B1 * | 4/2001 | Marui | 74/594.6 |
| 6,477,917 B1 * | 11/2002 | Peyre et al. | 74/594.6 |
| 7,073,409 B2 * | 7/2006 | Ho | 74/594.6 |
| 7,104,159 B2 * | 9/2006 | Plassiard et al. | 74/594.6 |
| 2004/0231454 A1 * | 11/2004 | Ho | 74/594.4 |
| 2005/0061104 A1 * | 3/2005 | Campagnolo | 74/594.6 |
| 2006/0081088 A1 * | 4/2006 | Muraoka et al. | 74/594.6 |
| 2008/0121068 A1 * | 5/2008 | Chen | 74/594.6 |

FOREIGN PATENT DOCUMENTS

| | | |
|---|---|---|
| FR | 2620409 A1 | 3/1989 |
| FR | 2862041 A1 | 5/2005 |
| GB | 2266687 A | 11/1993 |
| JP | 02145321 A | 6/1990 |
| NL | 1010504 | 5/2000 |
| WO | WO-0020943 A1 | 4/2000 |
| WO | WO-0283490 A1 | 10/2002 |

* cited by examiner

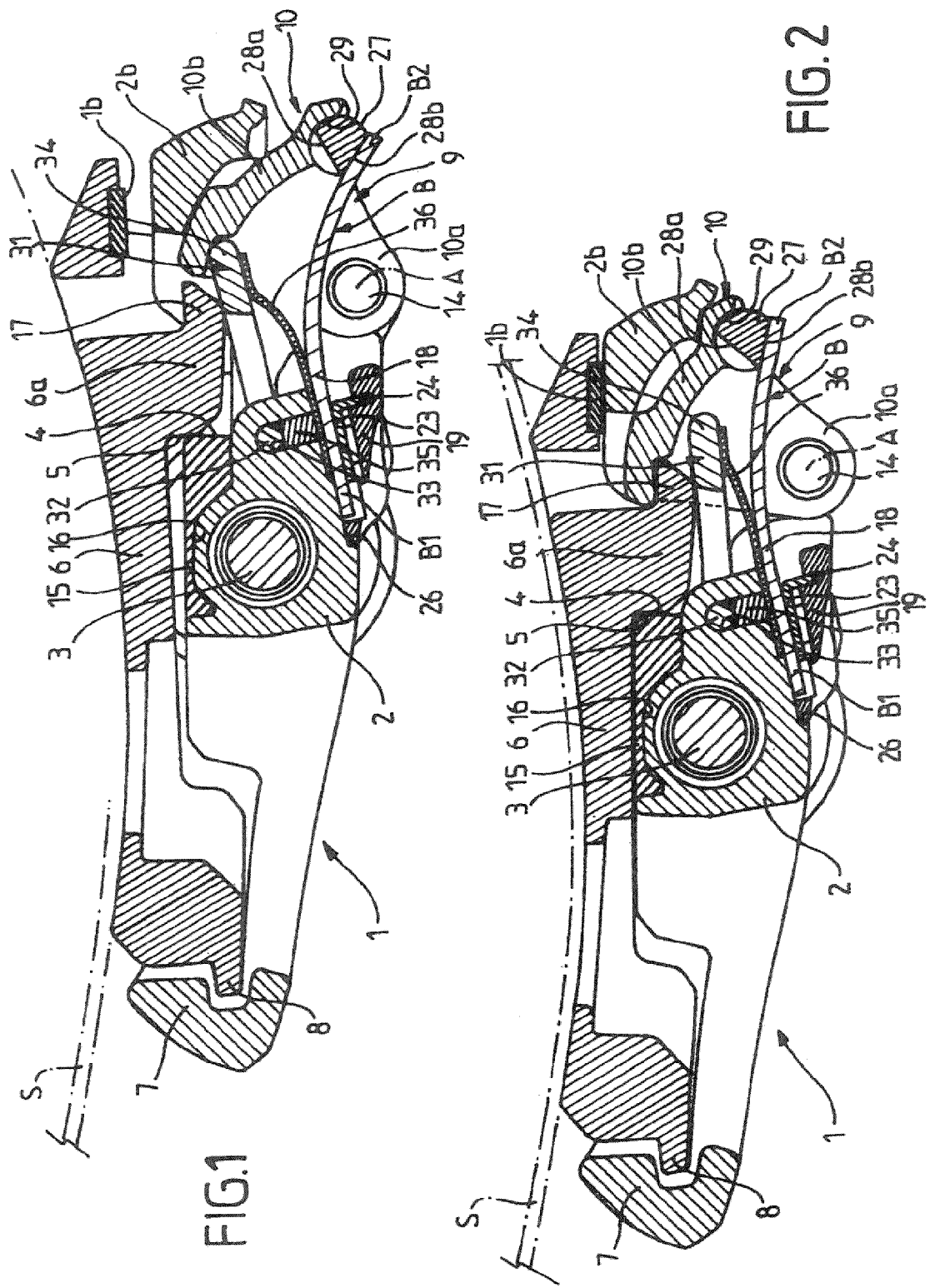

BICYCLE PEDAL WITH AUTOMATIC ATTACHMENT AND DETACHMENT

CROSS REFERENCE TO RELATED APPLICATIONS

This application is a National Phase filing under 35 U.S.C. §371 of PCT/FR2008/000157 filed Feb. 8, 2008, which claims priority to Patent Application No. 0701017, filed in France on Feb. 13, 2007. The entire contents of each of the above-applications are incorporated herein by reference.

The invention relates to a bicycle pedal with automatic engagement and disengagement, of the kind which comprise a body mounted so that it can rotate on a spindle with:
 a frontal stop means able to collaborate with a mating stop surface provided on a cleat fixed under the sole of the user's shoe;
 a retaining member mounted to rotate about a pivot pin parallel to the pedal spindle, able to be pressed by an elastic return means against the cleat in order to attach the cleat to the pedal.

Automatic bicycle pedals are widely used by cyclists for all kinds of riding such as road racing, MTB riding, cycle touring and the like. The cyclist engages the cleat by placing it over the pedal and applying pressure with his foot, causing the cleat to attach to the pedal by the opening followed by the return against the cleat of the mobile retaining member.

Patents EP 1 377 496 B1 and FR 2 862 041 in the name of the Applicant Company disclose such pedals.

For disengagement and detachment the cyclist twists his foot which allows the cleat to be released automatically from the pedal through the opening of the retaining member.

Such automatic pedals are satisfactory but are relatively heavy and bulky. The component parts also take a relatively long time to assemble.

It is a key objective of the invention to provide an automatic pedal of the aforementioned type the weight of which is lower by comparison with the existing solutions, as is the size. Furthermore, it is desirable for the assembly of this pedal to be made quicker. It is also appropriate that the pedal design should remain robust and economical.

According to the invention, a bicycle pedal with automatic engagement and disengagement, of the kind defined hereinabove, comprises an elastic return means comprising a flex element immobilized at one end in the pedal body, the mean longitudinal direction of which is orthogonal to the pedal spindle and the other end of which rests against the retaining member, and is characterized in that:
 the retaining member consists of a bow in the overall shape of a U having two radially directed branches connected by a central part,
 and the flex element consists of a flex plate of which the end, other than the end immobilized in the body, rests against the bow.

For preference, the flex element rests against the lower edge of the central part of the bow.

The flex plate may be of rectangular shape or of trapezoidal shape with the long base housed in the pedal body and the short base resting against the retaining member.

The flex plate may be made of composite material, particularly with glass fibers or carbon fibers bound by a resin and directed orthogonal to the pedal spindle.

Advantageously, one end of the plate is immobilized in the pedal body by in-building achieved by clamping the end of the flex plate against the pedal body using a cap. The cap may be made of plastic stiffened by a metal bracket.

According to an alternative, the immobilized end of the plate is housed in the pedal body without being blocked therein, the top side of the end pressing against the body and friction between contacting surfaces holding the plate in place, a rod secured to the body extends transversely under the plate the underside of which rests against the rod, the other end of the plate resting, via its top face, against the retaining member such that the plate works in bending on three points.

At its end furthest from the in-building, the flex plate preferably rests against a transverse stop element mounted such that it can rotate on the retaining member of the pedal. This transverse stop element may be formed by a cylinder mounted such that it can rotate and comprising several flat faces at different radial distances from the geometric axis of the cylinder, rotating this element making it possible to modify the preload of the flex plate.

The retaining member may consist of a bow in the overall shape of a U having two radially directed branches connected by a transverse part. The bow is inscribed inside the rear of the pedal body which on each side comprises a downwardly projecting lug, the exterior face of one branch of the bow pressing against the interior face of the associated lug, each lug in its bottom part having a bore to accommodate a pivot pin passing through an orifice in the associated branch, the space between the pivot pins remaining clear.

The pedal advantageously comprises a pawl capable of keeping the retaining member in an open position, when the cleat is disengaged, against the action of a leaf spring, and of releasing this retaining member when the cleat is engaged; the pawl is produced in the form of a frame of which one transverse edge is engaged in a housing of the pedal body and constitutes the pivot pin for the pawl, the other end of the pawl resting against the retaining member. In order to limit the number of parts, the leaf spring of the pawl may be made as one piece with the pawl in plastic, the assembly being held above the flex element by clamping.

A ready-to-fit subassembly can be formed by engaging the leaf spring and the flex plate in an opening in the cap. This subassembly may also comprise the pawl, particularly when the pawl and the leaf spring are made as a single part.

According to an advantageous alternative form, the rear of the pedal body has no high transverse rear part that can serve to support the rear of the cleat, and a stop means is provided at the top rear of the bow to collaborate with a mating stop means provided in the lower part of a rear extension of the cleat, and to prevent attachment when the front snout of the cleat is not correctly engaged under the front lip of the pedal.

Apart from the arrangements set out hereinabove, the invention consists in a certain number of other arrangements that will be dealt with more fully hereinbelow with reference to an exemplary embodiment described with reference to the attached drawings, but which is not in any way limiting. In these drawings:

FIG. 1 is a vertical section through a pedal according to the invention, on a plane orthogonal to the pedal spindle, the cleat being in the process of being attached.

FIG. 2 shows, in a similar way to FIG. 1, the pedal with the cleat attached.

Figure 3:
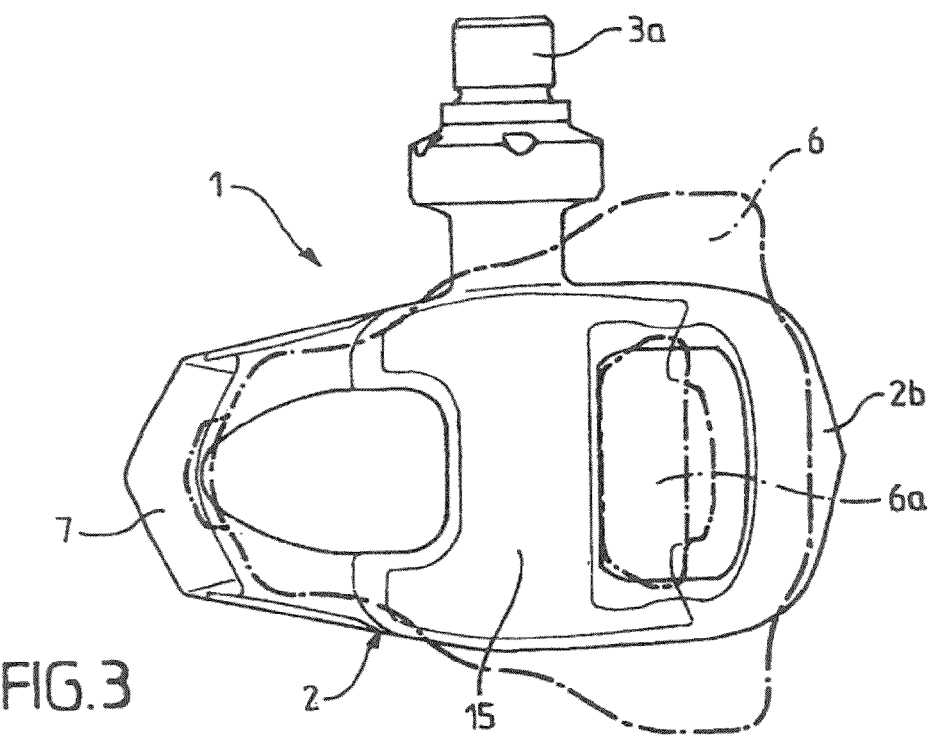
FIG. 3 is a view from above of the pedal of FIGS. 1 and 2, to a different scale.

Reference is made to the drawings which show a bicycle pedal 1 with automatic engagement and disengagement. The pedal depicted in the example is intended to be mounted on the left side of the bicycle.

Hereinafter, the terms "front" and "rear" are to be understood as referring to a pedal in a horizontal position mounted on a bicycle and with reference to the normal direction of travel of the bicycle.

The pedal 1 comprises a body 2 able to rotate on a spindle 3 which projects from one side of the body in the form of a part 3a designed to have a screw thread so that it can be mounted at the end of a crank arm.

The pedal 1 comprises, on at least one face of the body, a frontal stop means 4 able to collaborate with a mating stop surface 5 provided on a cleat 6 fixed under the sole S of the user's shoe. The cleat 6 comprises a downwardly projecting part 6a forming a cam. The stop 5 consists of the frontal face of the projection 6a.

A lip 7 situated at the front of the pedal forms a return toward the pedal spindle 3. A snout 8 provided at the front of the cleat 6 fits under the lip 7.

A retaining member 9 is mounted such that it can rotate about a geometric axis of articulation A parallel to the pedal spindle. In the embodiment depicted, the axis A is situated to the rear of the pedal spindle 3 and lower down than this spindle when the pedal is horizontal. The retaining member 9 advantageously consists of a bow 10 in the overall shape of a U the concave face of which faces forward. This bow has two radially directed branches 10a connected by a part 10b that forms a cross member and is bounded by a cylindrical surface the geometric axis of which is the axis A.

As an alternative, the bow 10 could be situated in front of the spindle 3, with its concave face facing rearward, the cam 6a would then also face in the opposite direction.

Figure 5:
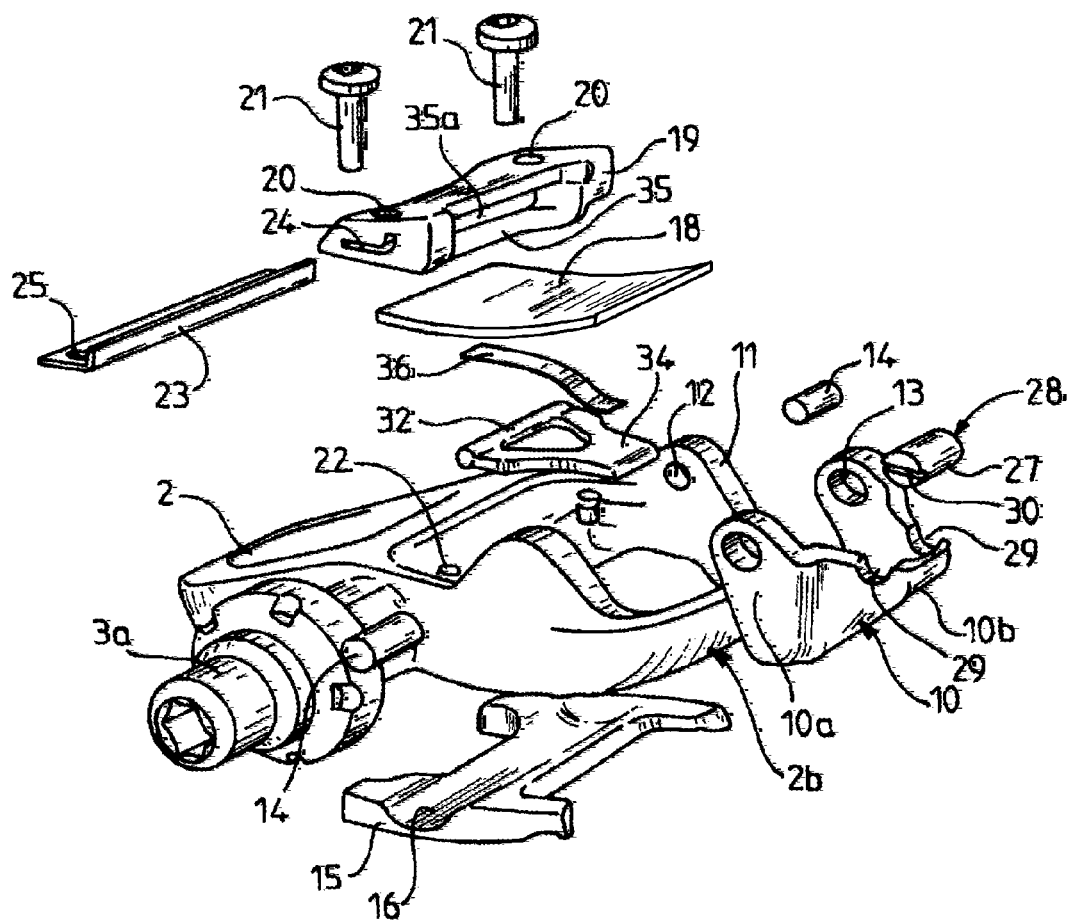
FIG. 5 is an exploded perspective view of the pedal turned over to face downward.
Figure 6:
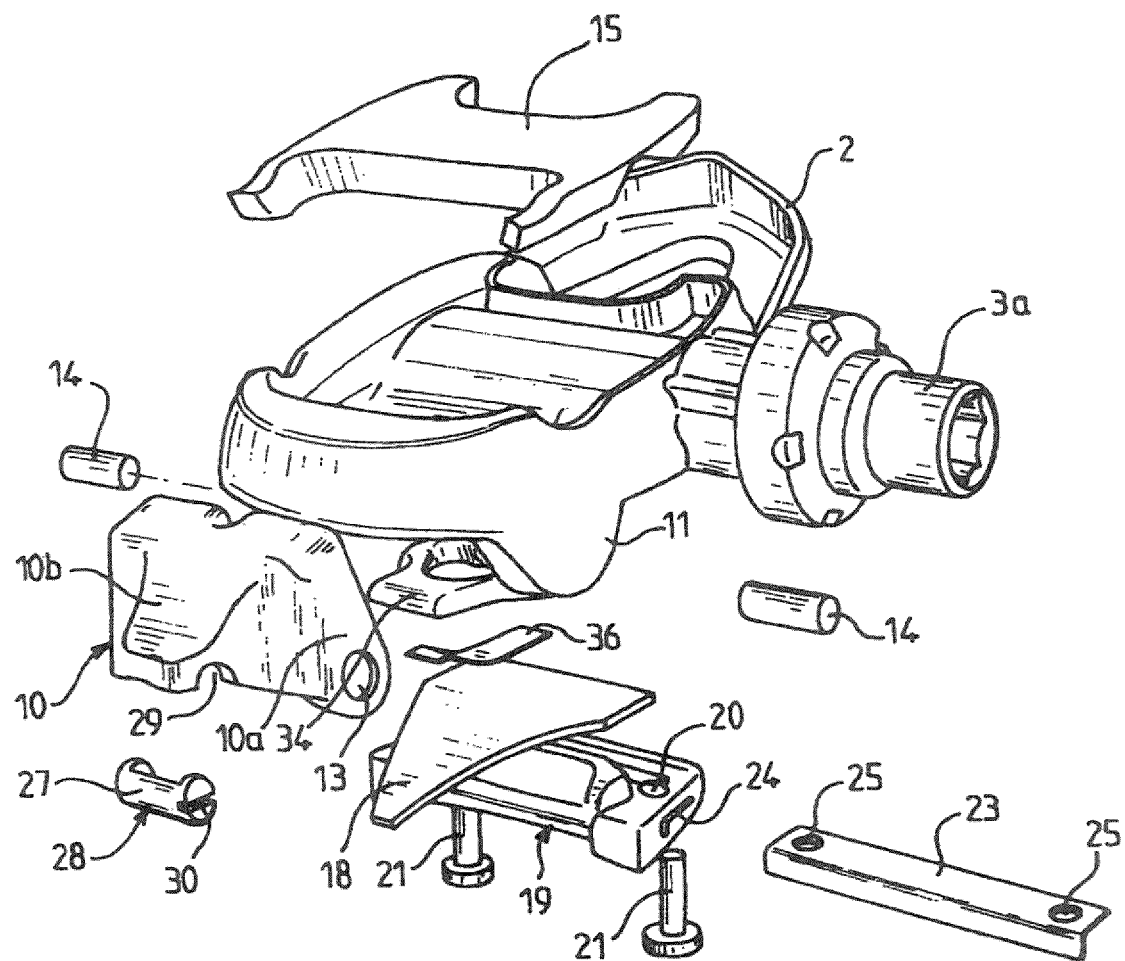
FIG. 6 is an exploded view of the pedal facing upward.

The bow 10 is inscribed in the rear of the pedal body. The rear of the pedal body may consist of a contour 2b, forming a cage member. As an alternative, this contour 2b could not exist. The contour 2b comprises, as visible in FIG. 6, on each side, a downwardly projecting lug 11. The exterior face of one branch 10a presses against the interior face of the associated lug 11. Each lug 11 comprises, in its bottom part, a bore 12 (FIG. 5) opening at least onto its internal face. This bore 12 may be blind and closed at the end corresponding to the external face of the lug. As an alternative, the bore 12 may open onto the external face. The bores 12 of the two lugs 11 situated on each side of the pedal body have the same geometric axis.

Each branch 10a of the bow comprises a through-orifice 13 (FIG. 5) capable of being positioned facing a corresponding bore 12. The two orifices 13 have the same geometric axis. Once the branches 10a have been engaged between the lugs 11, a pin 14 is fitted on each side, engaging it in the orifice 13 and in the bore 12. The cylindrical pin 14 is force-fitted into the bore 12. The two pins 14 housed in each of the lugs 11 are coaxial and allow the bow 10 to be mounted such that it can rotate between the lugs 11. The lengths of the pins are limited to the sum of the thicknesses of the walls through which the pins 14 pass so that the space between the interior ends of the pins remains clear.

As an alternative, the lug 11 may comprise two cheeks separated by a housing accommodating the branch 10a between the cheeks, which cheeks each have a bore to accommodate the ends of the pin 14. This clevis-block mounting of each pin then makes the articulation more rigid.

The part 6a of the cleat that projects downward becomes housed behind a platform 15 of the pedal, with an underside 16 covering the region of the spindle 3. The rear face of the platform 15 constitutes the frontal stop means 4. The cam 6a comprises, at its lower part, a rearwardly projecting snout 17 that can be covered by and attached to the bow 10.

The elastic return means of the bow 10 comprises a flex element B the longitudinal mean direction of which is orthogonal to the pedal spindle 3. One end B1 of the flex element is housed in the pedal body 2 while the other end B2 rests against the bow 10, at the lower edge of the transverse part thereof, so as to exert a return force in the counterclockwise direction, according to FIGS. 1 and 2, about the geometric axis A. The flex element B passes above the geometric pivot axis A of the retaining member 9. According to the alternative form of FIGS. 1 and 2, the end B1 is in-built, that is to say blocked, in the pedal body 2.

Figure 4:
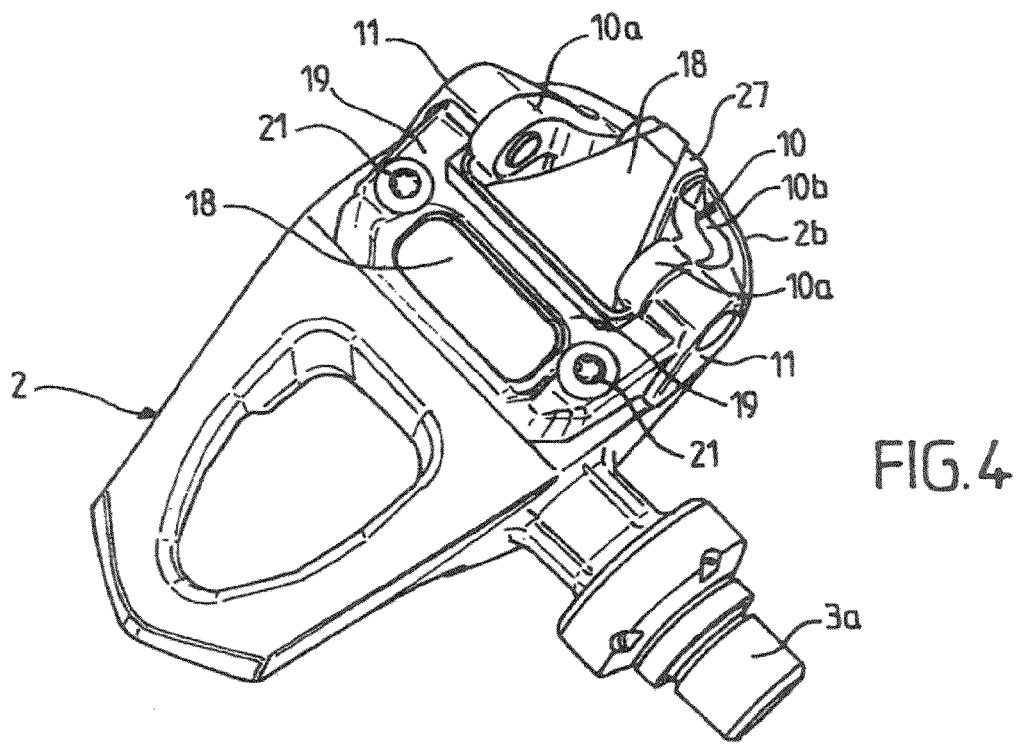
FIG. 4 is a perspective view of the pedal turned over to face downward.

The flex element B advantageously consists of a flex plate 18. When this plate 18 is made of a homogeneous and isotropic material, for example of a metal notably stainless steel, this plate 18 is preferably configured in an isostress form. It is then substantially in the shape of an isosceles trapezium of which the long base is in-built into the body 2 and the short base rests against the bow 10, as can be seen in FIG. 4.

The plate 18 may be made of composite material, in particular a material consisting of glass fibers or carbon fibers bound by a resin and directed essentially orthogonal to the spindle 3. In such a case, the plate 18 is preferably of rectangular shape (FIG. 5) to limit the risks of delamination of the plate in the region of contact between its marginal edges and the bow 10. However, when the fibers have crossed orientations, the isostress trapezium form may be envisioned. If need be, the flex plate may, in its region that is intended to be in-built, have a T-shaped profile, for example, guarding against any possible risk of slippage of the plate when stressed.

The plate 18 is in-built into the pedal body 2 using a cap 19, for example made of plastic, of rectangular overall shape. The cap 19 has stiffened profiles and two holes 20 spaced apart parallel to the spindle 3 of the pedal. The holes 20 are designed to accept locking screws 21 which collaborate with tapped holes 22 provided in the pedal body. The holes 22 open into the underside of the pedal body.

The cap 19 is reinforced by a metal bracket 23 of which one flange, perpendicular to the plate in its in-built region, is fitted into a groove 24 of the cap 19, while the other flange of the bracket projects forward and presses against the underside of the plate 18. This second flange of the bracket 23 comprises two holes 25 which align with the holes 22 and 20 so that the screws 21 which flank the forward edge of the plate 18 can pass through them. An alternative design may be envisioned in which the metal bracket 23 is directly overmolded by the cap 19.

In order to limit the concentration of stresses in the plate at the in-built edge, said in-built zone may consist of material that is very slightly soft in the region directly in contact with the plate, or the plate itself may consist of one or more layers of elastomer.

The underside of the pedal body 2 comprises, in its rear region, a surface that is set back in the vertical direction, bounded toward the front by a step 26 against which the front edge of the cap 19 rests.

The end of the flex plate 18 furthest from the in-building rests against the bow 10 via a transverse stop element mounted such that it can rotate on the bow 10. The stop element 27 advantageously consists of an adjusting cylinder 28 having circular bearing surfaces at its two longitudinal ends, which bearing surfaces are housed in semicylindrical housings 29 that are open downward when the pedal is horizontal. The housings 29 are provided in side walls orthogonal to the pedal spindle 3, these walls projecting toward the rear of the bow 10. The spacing between the housings 29, parallel to the axis A of the pedal, is less than the separation between the orifices 13.

Between its circular end bearing surfaces, the cylinder 28 has flat facets 28a, 28b, parallel to the axis of the cylinder, and lying respectively at different radial distances from the geometric axis of this cylinder 28. At least one of the end faces of the cylinder 28 comprises a diametral slot 30 (FIG. 5) so that the cylinder 28 can be turned in the housings 29, for example using a screwdriver, in order to effect adjustment.

The end of the plate 18 rests against one of the facets of the cylinder 28, for example against the facet 28b according to FIGS. 1 and 2. Because the cylinder 28 is mounted such that it can rotate in the housings 29, as the bow 10 rotates, the end of the plate 18 may remain in contact across the entire expanse of the face 28b by virtue of the rotating of the cylinder 28 in the housings 29.

By altering the angular position of the cylinder 28 it is possible to cause the end of the plate 18 to rest against a different facet such as 28a which lies a different distance away from the axis of the cylinder, thus altering the stress in the plate 18 and therefore the elastic return force on the bow 10. It is thus possible to adjust the return torque applied to the bow 10.

Advantageously, the pedal also comprises a pawl 31 sensitive to whether the cleat 6 is off or on the pedal. The pawl 31 is designed to keep the retaining member 9, formed by the bow 10, in an open position illustrated in FIG. 1 when the cleat is off, against the action of the elastic return means 18.

The pawl 31 is produced in the form of a frame (see FIG. 5) having a front cross member 32 of cylindrical shape constituting an articulation member housed in a housing 33 provided in the pedal body 2 and open downward. The housing 33 runs parallel to the pedal spindle. Branches extend backward from the ends of the cross member 32 to meet and form a substantially rectangular plate-like feature 34. When the pawl 31 is in the raised position (FIG. 1), the plate-like feature 34 rests against the front edge of the cross member of the bow 10 to keep this bow in the open position.

The cross member 32 is held against the semicylindrical upper end wall of the housing 33 by a bar 35 of the cap 19. Beneath the bar 35, the cap has a transverse opening 35a (FIG. 5) across which the flex plate 18 and a leaf spring 36 pass. The pawl 31 is returned to the raised position (FIG. 1) by the leaf spring 36 of which the front part is blocked in the pedal body 2 by being clamped between this body and the leaf 18. The leaf 36 is curved and rests against the plate-like feature 34 via its end furthest from the pedal body 2.

The pawl 31 is advantageously made of plastic. The leaf spring 36 may be made as a single piece with the pawl in plastic.

Means that provide positive blocking in a direction orthogonal to the spindle 3 may be provided between the flex plate 18 and the body 2, notably in the form of mating pegs and housings, to supplement the stopping due to the clamping.

The cap 19 is able simultaneously to block the flex plate 18 and the leaf spring 36 by clamping, and to hold the pawl 31 in position.

The platform 15 of the pedal body is either overmolded or added on and held in place by an effective fixing means. The platform 15 is made of a material which may differ from that of the body 2, preferably of a material that displays good performance in terms of resistance to wear and to hammering in regions such as 4 of contact with the cleat 6.

Toward the rear, the cleat 6 may have a soft region 1b designed to press against the rear bridge 2b of the pedal body in order to counter vertical float.

Assembly of the bow 10 of the flex plate 18 and of the pawl 31 is particularly simple and quick. The series of assembly operations indicated hereinbelow may be adapted to suit.

To begin with, the bow 10 is installed in the body 2 by positioning the branches 10a of the bow between the lugs 11 of the pedal body and by placing the orifices 13 in register with the bores 12. The pins 14 are then fitted, from the inside, into the orifices 13 and the bores 12. An empty space remains between the pins 14 for the assembly of the next components. The bow 10 is pushed back into the raised position illustrated in FIG. 2 and the cross member 32 of the pawl 31 can be fitted into the housing 33. The cylinder 28 is placed in the housings 29.

The cap 19 with the bracket 23, the leaf spring 36 and the flex plate 18 are then fitted. To make the pedal easier to assembly, a ready-to-assemble subassembly is advantageously formed by fitting the leaf spring 36 and the flex plate 18 into the opening 35a of the cap beforehand, while the bracket 23 is also fitted into the cap, beneath the plate 18. When the leaf spring 36 is made as a single piece with the pawl 31, the bar 35 finds itself clamped slightly between the cross member 32 and the leaf 36, helping the subassembly, which then also comprises the pawl 31, to stay together.

The leaf 36 and the plate 18 are then blocked against the pedal body 2 by the cross member 23 and the cap 19, using the screws 21.

The preload of the flex plate 18 is adjusted by orienting the cylinder 28 into the appropriate position.

The way in which the pedal works is recalled briefly hereinbelow.

When the cleat 6, 6a is not engaged, as illustrated in FIG. 1, the pawl 31 is in the raised position and its rear edge rests against the closed end of a housing provided in the front transverse edge of the bow 10. This bow 10 is kept in the retreated open position.

When the cyclist wishes to attach the cleat 6 to the pedal 1, he engages the front snout under the lip 7 and causes the cam 6a to drop down into the empty space situated to the rear of the platform 15 and in front of the rear cage member 2b of the pedal. Because the bow 10 is retreated, the cyclist encounters no appreciable resistance in pushing the cam 6a down into this empty space and pushing the pawl 31 downward, because the force exerted by the elastic leaf 36 is relatively light.

The lowering of the pawl 31 by rotation in the clockwise direction about its cross member 32 releases the bow 10 which, under the action of the flex plate 18, is returned in the counterclockwise direction about the pins 14. The transverse branch of the bow 10 covers and fastens onto the rear snout 17 of the cleat 6. The cleat 6 and the shoe to the underside of which this cleat is fixed are then attached to the pedal.

Disengagement or detachment of the cleat 6 is obtained by rotating the foot and the cleat 6 which causes the bow 10 to retreat until the snout 17 is released.

When the cleat 6 separates from the pedal 1 with the bow 10 in the open position, the pawl 31 is raised under the action of the elastic leaf 36 and its rear edge comes into line with the central branch 10b of the bow 10 which is thus kept in the open position illustrated in FIG. 1.

The pedal according to the invention is of a simple and robust design allowing rapid assembly. Creating the elastic return means in the form of a flex plate 18 allows a reduction in weight, as does splitting the articulation down into two pins 14 of shorter length. It also makes it easy to house the pawl function thanks to a compact design.

Figure 7:
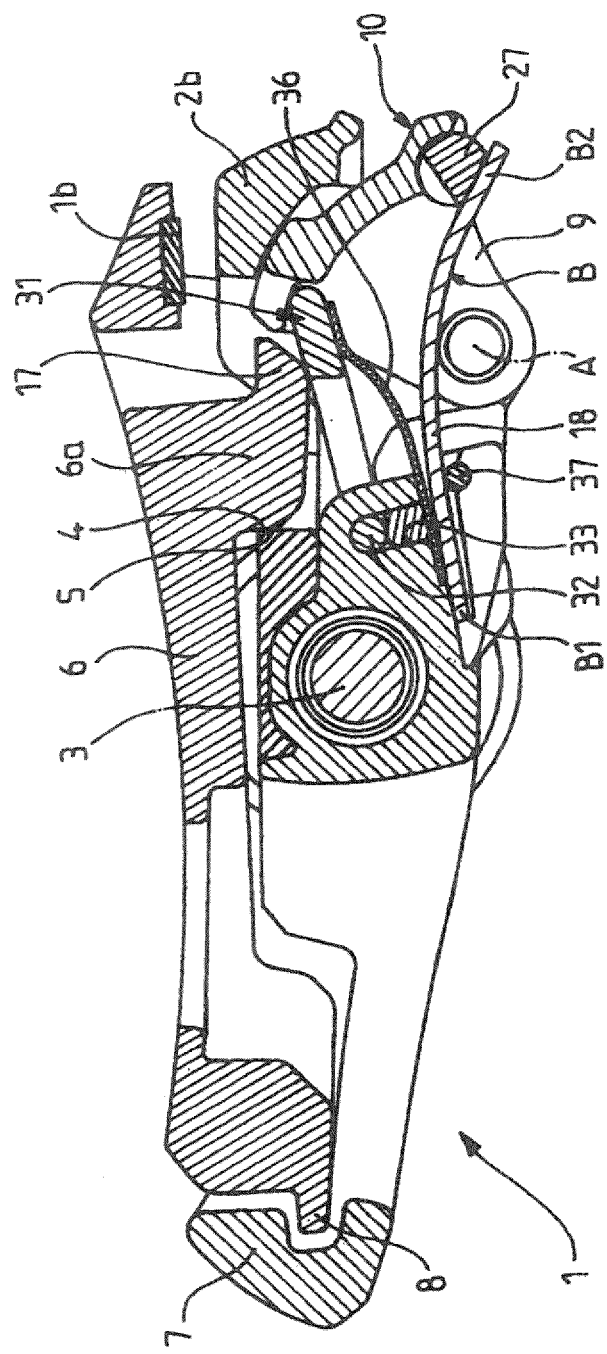
FIG. 7 is a vertical section, similar to FIG. 1, of an alternative form of embodiment.

FIG. 7 shows an alternative form of embodiment of the pedal of FIGS. 1 and 2. The only modification introduced relates to the mounting of the flex plate 18 which, instead of being in-built into the body 2 at its end B1, simply rests against this body. The other elements of the pedal of FIG. 7 are identical or similar to those of FIGS. 1 and 2 and are denoted by the same references without being described afresh.

The end B1 of the plate 18 is housed in the body 2 without being blocked therein. The top face of the end B1 rests against the body 2 and the friction between contacting surfaces holds the plate 18 in place. A rod 37, preferably a cylindrical rod of circular cross section, is secured to the body 2 and extends transversely under the plate 18, substantially in line with the rear wall of the housing 33. The underside of the plate 18 rests against a generatrix of the rod 37. The other end B2 of the plate 18 rests, via its top face, against the stop element 27.

The plate 18 operates in bending on three points, namely two ends points situated above the plate, and an intermediate point situated beneath.

The working of the pedal of FIG. 7 is similar to that explained previously.

Figure 8:
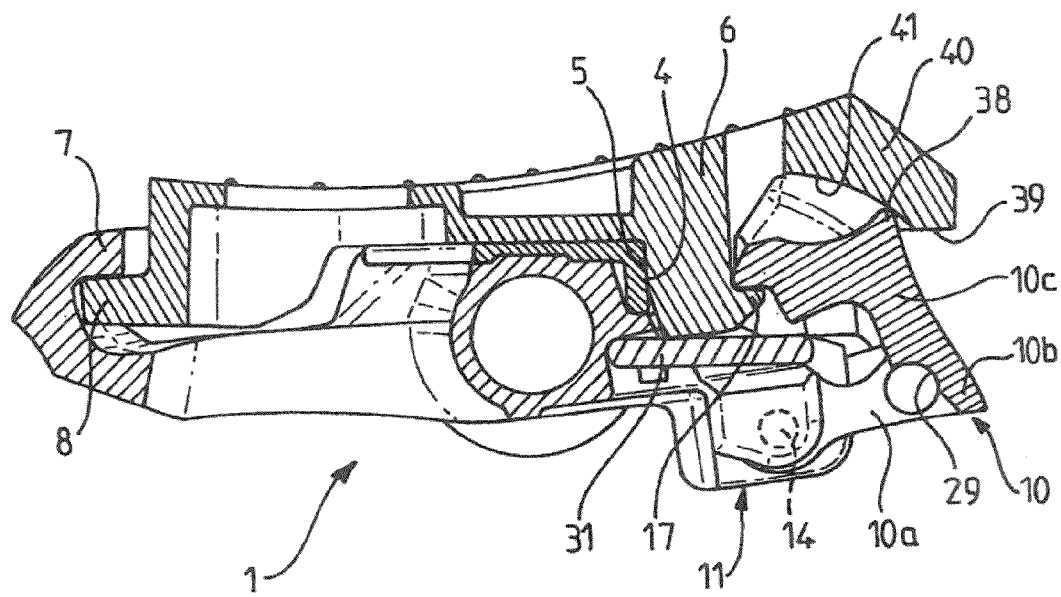
FIG. 8 is a section on a central vertical longitudinal plane, similar to FIG. 2, of another alternative form of embodiment, with some parts not depicted.
Figure 9:
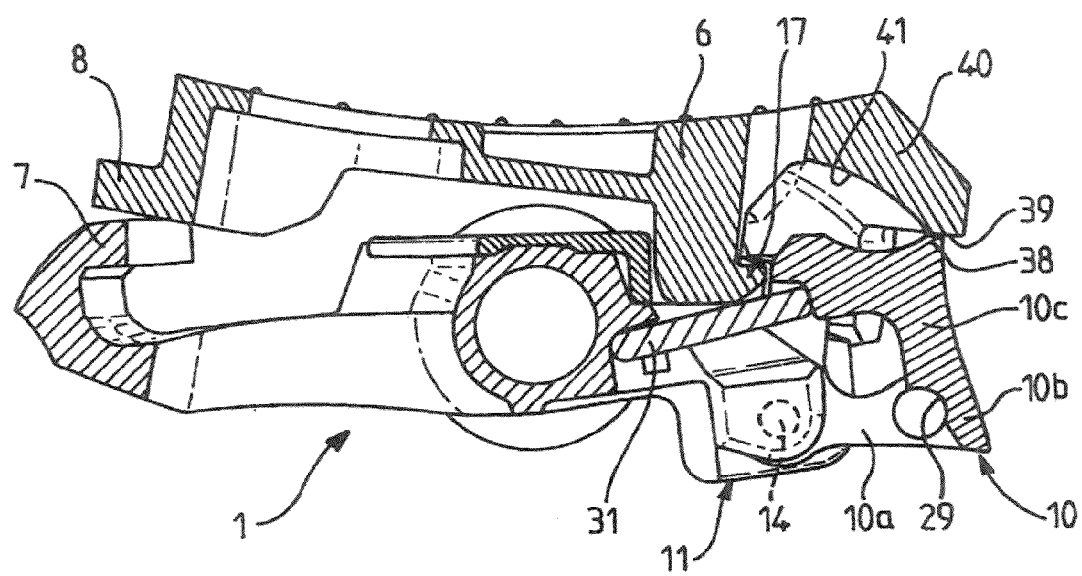
FIG. 9 is a vertical section, similar to FIG. 8, of the cleat stopped in a poor position in the process of being attached.

FIGS. 8 and 9 show an advantageous alternative form of embodiment of the pedal of FIGS. 1-6. In this alternative form, the contour 2*b* that constitutes the rear part of the pedal body in the preceding figures is omitted.

The elements of the pedal of FIGS. 8-9 that are identical to or perform similar functions to elements already described in respect of the preceding figures are denoted by the same numerical references and are not described again.

According to FIG. 8, the branches 10*a* of the bow, which are articulated to the pedal body by a pin 14, are substantially horizontal and connected, at the rear, by a cross member 10*b* perpendicular to the plane of FIG. 8. Mid-way along the branches 10*a*, the bow comprises a part 10*c* rising upward from the cross member 10*b*. The part 10*c*, which is substantially in the shape of an inverted L, constitutes the means of attachment of the rear snout 17 of the cleat 6.

The front snout 8 of the cleat 6 butts via its upper face against the underside of the lip 7 to provide upward retention. The forward abutment of the cleat is still afforded by the collaboration between the rear surface 4 of the pedal platform, situated to the rear of the geometric axis of rotation of the pedal, and the frontal surface 5 of the cleat.

In FIGS. 8 and 9, the flex element B which constitutes the elastic return means for the bow 10 is not depicted. The same is true of the stop element 27 which is positioned in the housings 29.

In the case illustrated in FIG. 9 in which the snout 8 at the front of the cleat is not engaged under the lip 7, the absence of the rear part 2*b* of the pedal of the preceding figures allows the cleat 6 to catch on the bow 10 the cleat 6. Such attachment of the cleat 6 in a poor position needs to be prevented.

To do this, a stop means 38 is provided at the top rear of the bow 10 to collaborate with a mating stop means 39 provided at the bottom part of a rear extension 40 of the cleat 6 when the snout 8 is not correctly engaged under the lip 7. Collaboration between the stop means 38 and 39 prevents the cleat 6 from moving down and effacing the pawl 31 as this movement would cause the rear snout 17 of the cleat to catch on the part 10*c* of the bow 10.

The stop means 38 advantageously consists of a protrusion substantially of dihedral shape directed upward. The protrusion 38 is obtained by adding material to the top rear part of the part 10*c* of the bow. The mating stop means 39 consists of a substantially horizontal flat underside of the rear extension 40 which is limited downward, in front of the stop 39, by a concave surface 41 which can pass over the protrusion 38 when the front snout 8 is correctly engaged under the lip 7.

Omitting the rear part 2*b* results in a space saving and makes the pedal more compact. Manufacture is simplified and the appearance is enhanced.

The way in which the pedal of FIGS. 8-9 works is similar to the working described in reference to the preceding figures.

The invention claimed is:

1. A bicycle pedal with automatic engagement and disengagement, comprising a body mounted so that said body rotates on a spindle with:
   a frontal stop means configured to collaborate with a mating stop surface provided on a cleat fixed under a shoe sole;
   a retaining member mounted to rotate about an axis parallel to the pedal spindle, is pressed by an elastic return means against the cleat in order to attach the cleat to the pedal,
   the elastic return means comprising a flex element immobilized at one end in the pedal body, a mean longitudinal direction of which is orthogonal to the pedal spindle and an opposite end of the flex element rests against the retaining member,
   wherein:
   the retaining member comprises a U-shaped bow having two radially directed branches connected by a central part,
   the body comprises bores on each side of the body, the bores sharing a geometric axis, each branch of the bow comprising an orifice positioned facing one of the bores of the body, for articulation around the geometric axis of the respective bore, wherein articulation between the bow and the pedal body is supported by two pivot pins, each pivot pin being inserted into one of the bores and extending into one of the orifices, a length of each pin being limited to a depth of the respective bore plus a thickness of the respective branch of the bow through which each pin passes, and wherein a space along the geometric axis of the bores between interior ends of the pivot pins remains unobstructed,
   and the flex element comprises a flex plate of which the opposite end, other than the end immobilized in the body, rests against the central part of the bow at a distance from the spindle which is greater than a distance between the pins from the spindle.

2. The pedal as claimed in claim 1, wherein the flex element rests against a lower edge of the central part of the bow.

3. The pedal as claimed in claim 1, wherein the flex plate is of rectangular shape.

4. The pedal as claimed in claim 1, wherein the flex plate is of trapezoidal shape with a long base housed in the pedal body and the short base resting against the retaining member.

5. The pedal as claimed in claim 1, wherein the one end of the flex plate immobilized in the pedal body is immobilized in the pedal body by in-building achieved by clamping the end of the flex plate against the pedal body using a cap.

6. The pedal as claimed in claim 5, wherein the cap is made of a plastic stiffened by a metal bracket.

7. The pedal as claimed in claim 1, wherein the immobilized end of the plate is housed in the pedal body without being blocked therein, the top side of the end pressing against the body and friction between contacting surfaces holding the plate in place, a rod secured to the body extends transversely under the plate the underside of which rests against the rod, the other end of the plate resting, via a top face of the plate, against the retaining member such that the plate works in bending on three points.

8. The pedal as claimed in claim 1, wherein the opposite end of the flex plate rests against a transverse stop element mounted such that the stop element rotates on the retaining member of the pedal.

9. The pedal as claimed in claim 8, wherein the transverse stop element is formed by a cylinder mounted such that said cylinder rotates and comprising several flat faces at different radial distances from a geometric axis of the cylinder, rotating the cylinder modifies the preload of the flex plate.

10. The pedal as claim in claimed 1, wherein the bow is inscribed inside a rear of the pedal body which on each side comprises a downwardly projecting lug, an exterior face of each branch of the bow respectively pressing against an interior face of one of the lugs, each lug in a bottom part including one of the bores to accommodate one of the pivot pins.

11. The pedal as claimed in claim 1, wherein said pedal comprises a pawl configured to keep the retaining member in an open position, when the cleat is disengaged, against the action of a leaf spring, and to release the retaining member when the cleat is engaged, the pawl being produced in a form of a frame of which one transverse edge is engaged in a housing of the pedal body and constitutes the pivot pin for the pawl, an opposite transverse edge of the pawl resting against the retaining member.

12. The pedal as claimed in claim 11, wherein the frame of the pawl has a front cross member of cylindrical shape, constituting an articulation member housed in a housing provided in the pedal body and open downward, the housing running parallel to the pedal spindle.

13. The pedal as claimed in claim 11, wherein the one end of the flex plate is immobilized in the pedal body by in-building achieved by clamping the one end of the flex plate against the pedal body using a cap, and further, wherein the leaf spring and the flex plate are engaged in an opening in the cap.

14. The pedal as claimed in claim 1, wherein the rear of the pedal body has no high transverse rear part that serves to support the rear of the cleat, and a stop means is provided at a top rear of the bow to collaborate with a mating stop means provided in a lower part of a rear extension of the cleat, and to prevent attachment when a snout of the cleat is not correctly engaged under the front lip of the pedal.

15. The pedal as claimed in claim 1, wherein the flex plate is made of composite material, particularly with glass fibers or carbon fibers bound by a resin and directed orthogonal to the pedal spindle.

* * * * *